(12) United States Patent
Weaver et al.

(10) Patent No.: US 9,727,077 B2
(45) Date of Patent: Aug. 8, 2017

(54) SYSTEM FOR REDUCING PEAK ELECTROMAGNETIC INTERFERENCE IN A NETWORK DEVICE

(71) Applicant: Arista Networks, Inc., Santa Clara, CA (US)

(72) Inventors: James Weaver, Santa Clara, CA (US); Jeffrey Hirschman, Santa Clara, CA (US)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 14/878,887

(22) Filed: Oct. 8, 2015

(65) Prior Publication Data
US 2017/0102731 A1    Apr. 13, 2017

(51) Int. Cl.
*H03L 7/00*    (2006.01)
*G06F 1/10*    (2006.01)

(52) U.S. Cl.
CPC ...................................... *G06F 1/10* (2013.01)

(58) Field of Classification Search
CPC ........................................................ G06F 1/10
See application file for complete search history.

(56) References Cited

U.S. PATENT DOCUMENTS

| | | | |
|---|---|---|---|
| 5,952,890 A * | 9/1999 | Fallisgaard | ............ H03B 5/366 331/158 |
| 8,411,695 B1 * | 4/2013 | Chengson | ........... G06F 13/4022 370/419 |
| 2004/0109520 A1 * | 6/2004 | Hsu | ...................... H03K 5/1504 375/376 |

* cited by examiner

*Primary Examiner* — Daniel Puentes
(74) *Attorney, Agent, or Firm* — Chamberlain Hrdlicka

(57) ABSTRACT

A system for reducing peak electromagnetic interference in a network device. The network device includes multiple clock sources and multiple clocked components. Each clocked component receives a clock signal with an actual clock frequency from a separate clock source. The clock signals have an identical nominal frequency. The actual frequency of each clock signal deviates from the nominal frequency within a predetermined range.

22 Claims, 4 Drawing Sheets

SYSTEM FOR REDUCING PEAK ELECTROMAGNETIC INTERFERENCE IN A NETWORK DEVICE

BACKGROUND

Network devices such as switches, routers, or multilayer switches include integrated circuits that use clock signals in order to maintain synchronization between different circuits and/or in order to maintain circuit-internal synchronization. Emissions of electromagnetic energy by a network device may be synchronized with the clock signals generated within or provided to the network device.

SUMMARY

In general, in one aspect, the invention relates to a network device, the network device comprising a plurality of clock sources; and a plurality of clocked components, wherein each clocked component of the plurality of clocked components receives a clock signal with an actual clock frequency from a separate clock source of the plurality of clock sources, and wherein the clock signals have an identical nominal frequency, and wherein the actual frequency of each the clock signal from the plurality of clock sources deviates from the nominal frequency within a predetermined range.

In general, in one aspect, the invention relates to a network device, the network device comprising a clock generator that generates a plurality of output clock signals, wherein each output clock signal of the plurality of output clock signals has a unique clock frequency, wherein the clock frequencies of the plurality of output clock signals are distributed within a pre-determined frequency range; and a plurality of clocked components, wherein each clocked component of the plurality of clocked components receives one of the output clock signals.

Other aspects of the invention will be apparent from the following description and the appended claims.

DETAILED DESCRIPTION

Figure 1:
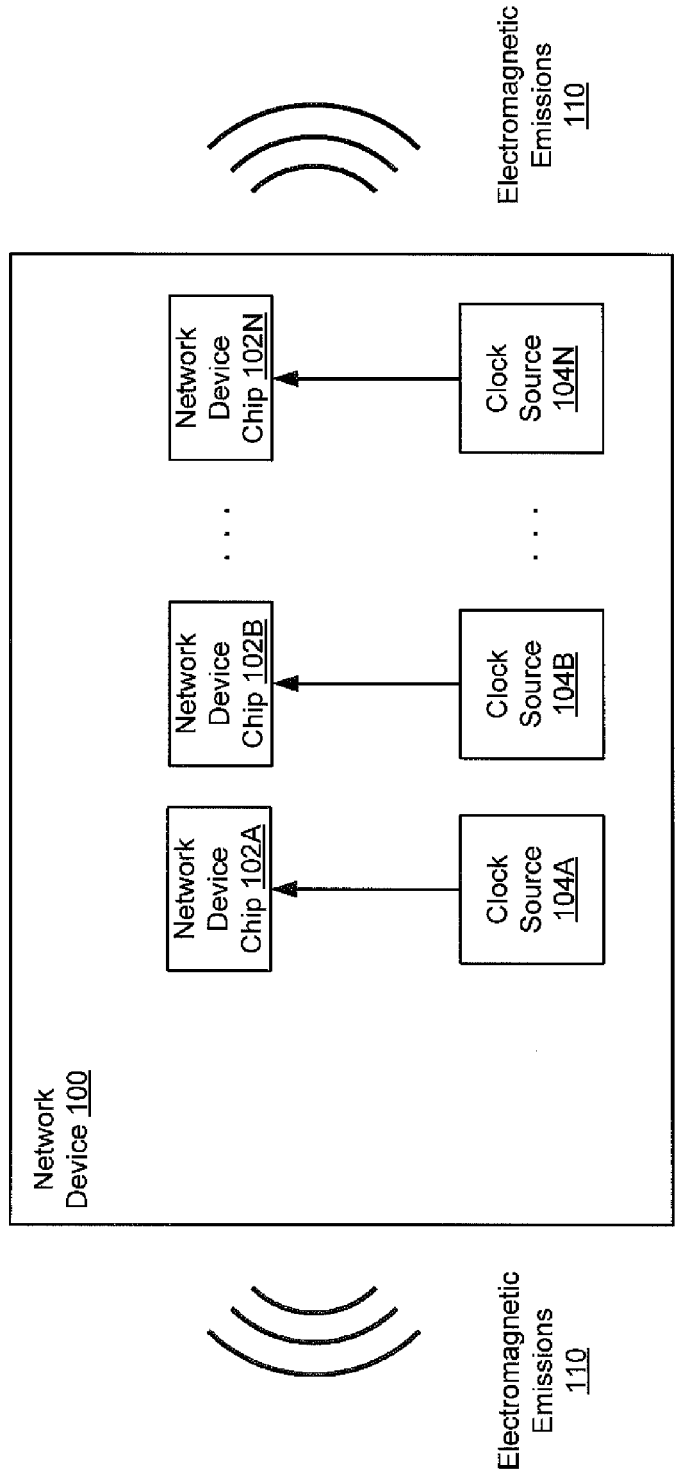
FIG. 1 shows a network device in accordance with one or more embodiments of the invention.

Specific embodiments of the invention will now be described in detail with reference to the accompanying figures. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description of FIGS. 1-4, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

In general, embodiments of the invention relate to a system for reducing the electromagnetic interference that a network device may cause. More specifically, one or more embodiments of the invention include a system for reducing electromagnetic emissions affiliated with clock signals of a network device. The following description describes embodiments of the invention in which the network devices may be, for example, switches, routers, or multi-layer switches, and in which the clocked components may be chips in the network device (e.g., network fabric chip, a PHY chip, etc.). However, the invention is not limited to a particular type of chip; rather embodiments of the invention may be extended to include any type of clocked component, e.g. CPUs, memory chips, or any other type of integrated circuit or circuit component that uses a clock signal. Further, the invention is not limited to a clock source providing a clock signal to a single clocked component; rather clock sources of a network device, in accordance with an embodiment of the invention, may provide a clock signal to any number of clocked components. In addition, embodiments of the invention include individual clocked components that receive clock signals from multiple different clock sources.

Electromagnetic emissions may cause electromagnetic interference (EMI) which may induce undesirable responses, malfunctioning or degradation in the performance of electrical equipment. Electromagnetic emissions may propagate via conduction and/or radiation. Conducted EMI may be caused by physical contact of conductors as opposed to radiated EMI which may be caused by induction, where a conductor acts as an antenna and the electromagnetic emissions radiate from the conductor. The type and behavior of EMI may depend on the frequency of operation and may be difficult to control at higher frequencies. At lower frequencies, EMI may be primarily caused by conduction, whereas at higher frequencies, EMI may be primarily due to radiation. At higher frequencies, any conductor, such as, for example, conductive traces on a printed circuit board (PCB) may become antennas that may emit and absorb electromagnetic fields.

EMI may be quantified by the emitted energy at a given frequency. The more energy is emitted from a frequency source, the larger the resulting EMI. Emission measurements may distinguish between peak emissions and average emissions. The average emission may be the average emitted energy measured over a given frequency spectrum, whereas peak emission may be the maximum emission registered at any frequency over a given frequency spectrum.

Electromagnetic emissions may be reduced by PCB design and fabrication methods, including, for example, multiple ground and power planes and enclosure shielding. Further, in accordance with one or more embodiments of the invention, peak electromagnetic emissions may be reduced, without necessarily reducing the average electromagnetic emissions, by spreading the total electromagnetic emissions over a wider frequency band, as described below.

A network device in accordance with one or more embodiments of the invention may include clocked components, i.e., for example, integrated circuits such as network device chips, central processing units and/or memory that may rely on a clock signal for timing. A clock signal may be a voltage signal that alternates between a low state and a high state at a clock frequency. The clock signal may be produced by a clock source, such as, for example, a crystal oscillator or other types of resonant circuits.

A clock signal in accordance with one or more embodiments of the invention may be a square wave in which the amplitude alternates at the clock frequency between a fixed minimum and a fixed maximum value with the same duration at minimum and maximum. The transition from minimum to maximum (rise time) and the transition from maximum to minimum (fall time) are near-instantaneous. Electromagnetic emissions may result from the generation and distribution of the clock signal, thus potentially causing electromagnetic interference. Clock signal distribution paths on the PCB may, for example, act as antennas radiating the electromagnetic field to the environment. The emitted electromagnetic signal may include multiple frequencies. In case of a square wave-shaped clock signal, for example, the emitted frequencies may include the nominal frequency of the clock signal and odd-integer harmonic frequencies. In the example of a 25 MHz square wave clock signal, electromagnetic energy may be emitted at 1*25 MHz=25 MHz (the nominal frequency), 3*25 MHz=75 MHz, 5*25 MHz=125 MHz, etc. In addition, when logic elements are clocked by a square wave clock signal, even-integer harmonic frequencies may be emitted as well. Accordingly, the emitted frequencies that may cause EMI may range from 25 MHz to much higher frequencies.

In one or more embodiments of the invention, not all clocked components may receive the same clock signal. In a network device in accordance with one or more embodiments of the invention, there may be multiple clock signals with different frequencies. In one or more embodiments of the invention, the frequencies may differ from a nominal frequency (i.e. the theoretical frequency that the clocked components have been designed for) within a small tolerance window. For example, the clocked components of the network device, in accordance with one or more embodiments of the invention, may be designed to operate at a nominal clock frequency of 25 MHz, but they may tolerate a clock signal within, for example, a +/−0.1% frequency window. Accordingly, the multiple clock signals may have frequencies within a range of 24.975 MHz-25.025 MHz. The distribution of these clock signals and the use of each of these clock signals by the logic of the network device (i.e. circuit components) may result in the emission of electromagnetic energy at discrete frequencies. However, because the frequencies of the clock signals all differ (for example, one clock may have a 24.975 MHz frequency, a second clock may have a 25 MHz frequency, and a third clock may have a 25.025 MHz frequency), the emissions peaks are located at different frequencies. The emissions of electromagnetic energy from the multiple clock signals with different frequencies therefore do not add up to high-amplitude electromagnetic emission peaks but rather form a series of smaller-amplitude peaks in frequency windows.

FIG. 1 shows a network device (100) in accordance with one or more embodiments of the invention. The network device (100) includes multiple network device chips (102A-102N). The network device chips (102A-102N) receive clock signals from multiple clock sources (104A-104N) rather than from a single clock source. In one embodiment of the invention, one clock source may provide a clock signal to a single network device chip. The network device chip may derive a higher-frequency clock signal from the clock signal. The derived higher-frequency clock signal may be, for example, a 5.15625 GHz signal, used to achieve a 10.3125 Gbps data transfer rate. All communications over network device ports (not shown) connected to the network device chip may be driven by this 5.15625 GHz signal, and accordingly electromagnetic energy affiliated with the 5.15625 GHz signal may be emitted. In another embodiment, a clock source may provide a clock signal to a group of clocked components such as, for example, any combination of network device chip(s), memory, and other clocked components, whereas other clock sources may provide clock signals to other groups of clocked components in the network device. In one or more embodiments of the invention, a clock source may be a crystal oscillator. In one or more embodiments of the invention, the clock sources (104A-104N) may have the same nominal frequency but slightly deviating actual frequencies, due to manufacturing tolerances. For example, the clock sources may all be crystal oscillators that have a 25 MHz nominal clock frequency, whereas the actual frequencies may range from 24.9975 MHz to 25.0025 MHz.

In one or more embodiments of the invention, the actual clock frequency of a crystal oscillator may deviate from the nominal frequency of the crystal oscillator due to, for example, impurities in the crystal, uneven thickness of the crystal and/or other manufacturing tolerances. Frequency tolerances may range, for example, from +/−5 to +/−100 ppm (parts per million). The actual frequency of a 25 MHz crystal oscillator with a +/−100 ppm rating, for example, may be anywhere between 24.9975 MHz and 25.0025 MHz. In one or more embodiments of the invention, the crystal oscillators may be randomly selected from a set of crystal oscillators of a specified frequency accuracy rating. For example, assuming that the clocked components of the network device, in accordance with one or more embodiments of the invention, tolerate clock signals that deviate up to +/−100 ppm from the nominal frequency, oscillators with an accuracy rating of +/−50 ppm may be selected. Accordingly, a first crystal oscillator (104A) may have an actual clock frequency of 25 MHz-10 ppm=24.99975 MHz, a second crystal oscillator (104B) may have an actual clock frequency of 25 MHz+2 ppm=25.00005 MHz, and another crystal oscillator (104N) may have an actual clock frequency of 25 MHz+15 ppm=25.000375 MHz. In one or more embodiments of the invention, the accuracy rating may be selected such that deviations of clock frequencies do not exceed the tolerance of the circuit for clock frequencies deviating from the nominal clock frequency, thus enabling the network device (100) to perform normally, despite slightly differing clock frequencies. In one or more embodiments of the invention, conductive tracks connecting a clock source to a network device chip, and/or any other component directly or indirectly connected to a clock source may emit electromagnetic signals that are synchronized with the clock signal, generated by the clock source. Due to the slightly differing clock frequencies of the clock sources, the electromagnetic emissions that are synchronized with the clock signals may have slightly different frequencies Furthermore, additional clock signals derived from the clock signals may also have slightly different frequencies. For example, network device chip (102A) may derive a higher-frequency clock signal from the clock signal provided by clock source (104A) that it uses in order to drive the communications over the network device ports (not shown) controlled by network device chip (102A). Accordingly, electromagnetic energy affiliated with the higher-frequency clock signal derived by network device chip (102A) may also be emitted. Network device chip (102B) may derive a similar higher-frequency clock signal from the clock signal provided by clock source (104B) that it uses in order to drive the communications over the network device ports (not shown) controlled by network device chip (102B). Accordingly, electromagnetic energy affiliated with the higher-frequency clock signal derived by network device chip (102B) may also be emitted. Because the clock frequencies of the clock sources (104A and 104B) are slightly different, the higher-frequency clock signals derived by network device chips (102A and 102B) are also slightly different.

In the example described above, the electromagnetic emissions may primarily occur at the 24.99975 MHz base frequency and at the harmonic frequencies, 2*24.99975 MHz=49.9995 MHz, 3*24.99975 MHz=74.99925 MHz, etc. for the clock signal generated by the first crystal oscillator (104A); at the 25.00005 MHz base frequency, and at the harmonic frequencies, 2*25.00005 MHz=50.0001 MHz, 3*25.00005 MHz=75.00015 MHz, etc. for the clock signal generated by the second crystal oscillator (104B); and at the 25.000375 MHz base frequency, and at the harmonic frequencies, 2*25.000375 MHz=50.00075 MHz, 3*25.000375 MHz=75.001125 MHz, etc. for the last crystal oscillator (104N). Additional clock signals that are derived from these clock signals may also deviate from the nominal clock frequency. The magnitude of the frequency deviation may depend on the multiplier used. The distribution and use of each of these clock signals by circuit components may therefore result in the emission of electromagnetic energy at discrete frequencies. However, because the frequencies of the clocks all differ, the emission peaks are located at different frequencies. As previously described, the emissions of electromagnetic energy from the multiple clock signals with different frequencies therefore do not add up to high-amplitude electromagnetic emission peaks but rather form a series of smaller-amplitude peaks in frequency windows. In the example described above, there may be, for example, small-amplitude emission peaks at 24.99975 MHz, 25.00005 MHz, and 25.000375 MHz, rather than a single large-amplitude emission peak at 25 MHz, i.e. the emitted electromagnetic energy may be distributed over a small frequency window, rather than being concentrated at a discrete frequency. Correspondingly, and in accordance with one or more embodiments of the invention, the electromagnetic emissions at harmonic frequencies are also distributed over small frequency windows rather than being concentrated at discrete frequencies. Accordingly, the overall electromagnetic emissions (110) radiated into the environment (120) by a network device (100), in accordance with one or more embodiments of the invention, consist of relatively low amplitude bands of electromagnetic emissions rather than isolated high amplitude peaks, as would be the case for a single clock signal distributed to all network device chips.

Figure 4:
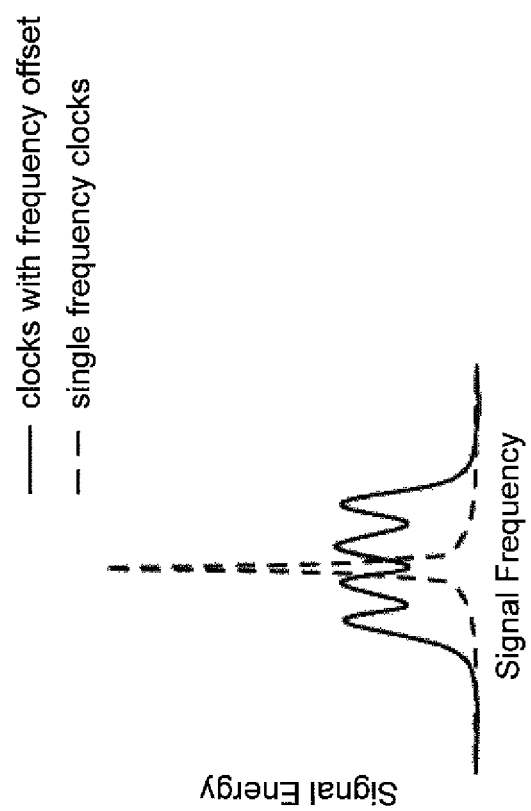
FIG. 4 shows a signal energy of electromagnetic emissions affiliated with clock signals in accordance with one or more embodiments of the invention in comparison to a signal energy of electromagnetic emissions affiliated with a conventional clock signal.

FIG. 4 qualitatively illustrates an example of the emitted signal energy of a network device in accordance with one or more embodiments of the invention in comparison to the signal energy emitted by a network device where a single clock signal is distributed to all network device chips. The signal emitted by the network device in accordance with one or more embodiments of the invention may emit low amplitude electromagnetic radiation across bands of frequencies rather than emitting large amplitude electromagnetic radiation at discrete frequencies. For simplicity, FIG. 4 illustrates the emissions at the base frequency only. Emissions at harmonic frequencies may be qualitatively similar, i.e., as a result of spreading the base frequency over a band of frequencies, the emissions at the harmonic frequencies may also be spread over frequency bands and, therefore, may also have reduced amplitudes. The amplitude and the width of the frequency bands at the harmonic frequencies may, however, be different from the amplitude and the width of the frequency band at the base frequency.

Figure 2:
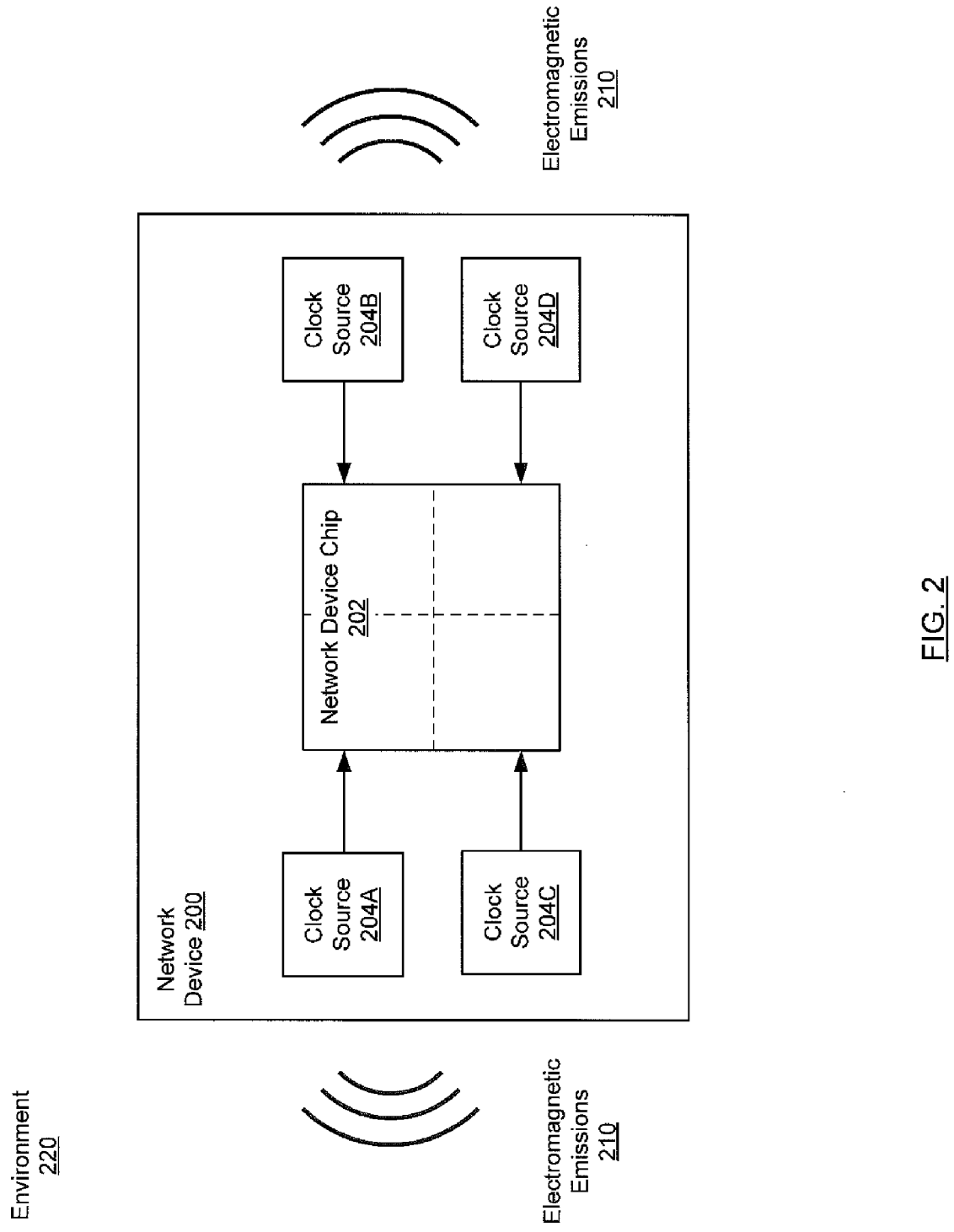
FIG. 2 shows a network device in accordance with one or more embodiments of the invention.

FIG. 2 shows a network device (200) in accordance with another embodiment of the invention. A network device chip (202) may have multiple clock inputs to provide clock signals to subdivisions (also referred to as subcomponents) of the network device chip. A subdivision may be, for example, a core of a central processing unit or any other component of an integrated circuit that may accept a clock signal. In one or more embodiments of the invention, the network device chip (202) supports clock signals that are not mesochronous, i.e. clock signals where the phase and the frequency of the clock signal may differ. The network device chip (202) of the embodiment shown in FIG. 2 includes four subdivisions that may receive independent clock signals, but a network device chip in accordance with an embodiment of the invention may include any number of subdivisions that may be clocked independently. Accordingly, in order to reduce the peak electromagnetic radiation emitted by the network chip (202) at discrete frequencies, the four subdivisions may be clocked separately using clock signals that have slightly different clock frequencies, as previously described. The network chip (202) may receive clock signals from clock sources (204A-204D), which may be, for example, crystal oscillators. The clock sources (204A-204D) may have identical nominal clock frequencies, whereas the actual clock frequencies may deviate from the nominal clock frequency within a specified range. For example, in the embodiment shown in FIG. 2, the clock signal provided by the first crystal oscillator (204A) may have an actual clock frequency of 25 MHz−10 ppm=24.99975 MHz, the clock signal provided by the second crystal oscillator (204B) may have an actual clock frequency of 25 MHz+2 ppm=25.00005 MHz, the clock signal provided by the third crystal oscillator (204C) may have an actual clock frequency of 25 MHz+15 ppm=25.000375 MHz and the clock signal provided by the fourth crystal oscillator (204D) may have an actual clock frequency of 25 MHz+20 ppm=25.0005 MHz.

In the example above, the electromagnetic emissions affiliated with the clock signals of the first crystal oscillator (204A) may be concentrated at the 24.99975 MHz base frequency, and at the harmonic frequencies, 2*24.99975 MHz=49.9995 MHz, 3*24.99975 MHz=74.99925 MHz, etc.; the electromagnetic emissions affiliated with the clock signals of the second crystal oscillator may be concentrated at the 25.00005 MHz base frequency, and at the harmonic frequencies, 2*25.00005 MHz=50.0001 MHz, 3*25.00005 MHz=75.00015 MHz etc.; the electromagnetic emissions affiliated with the clock signals of the third crystal oscillator (204C) may be concentrated at the 25.000375 MHz base frequency, and at the harmonic frequencies, 2*25.000375 MHz=50.00075 MHz, 3*25.000375 MHz=75.001125 MHz, etc.; and the electromagnetic emissions affiliated with the clock signals of the fourth crystal oscillator may be concentrated at the 25.0005 MHz base frequency, and at the harmonic frequencies, 2*25.0005=50.001 MHz, 3*25.0005 MHz=75.0015 MHz, etc.

As previously described, the distribution and use of each of these clock signals by circuit components therefore may result in the emission of electromagnetic energy at discrete frequencies. However, because the frequencies of the clocks all differ, the emission peaks are located at different frequencies. The emissions of electromagnetic energy from the multiple clock signals with different frequencies therefore do not add up to high-amplitude electromagnetic emission peaks but rather form a series of smaller-amplitude peaks in frequency windows, i.e. the emitted electromagnetic energy may be distributed over a small frequency window, rather than being concentrated at a discrete frequency. Correspondingly, and in accordance with one or more embodiments of the invention, the electromagnetic emissions at harmonic frequencies are also distributed over small frequency windows rather than being concentrated at discrete frequencies. Accordingly, the electromagnetic emissions (210) radiated into the environment (220) by a network device (200) in accordance with one or more embodiments of the invention therefore include relatively low amplitude bands rather than isolated high amplitude peaks of electromagnetic emissions, as illustrated by the qualitative example shown in FIG. 4.

Figure 3:
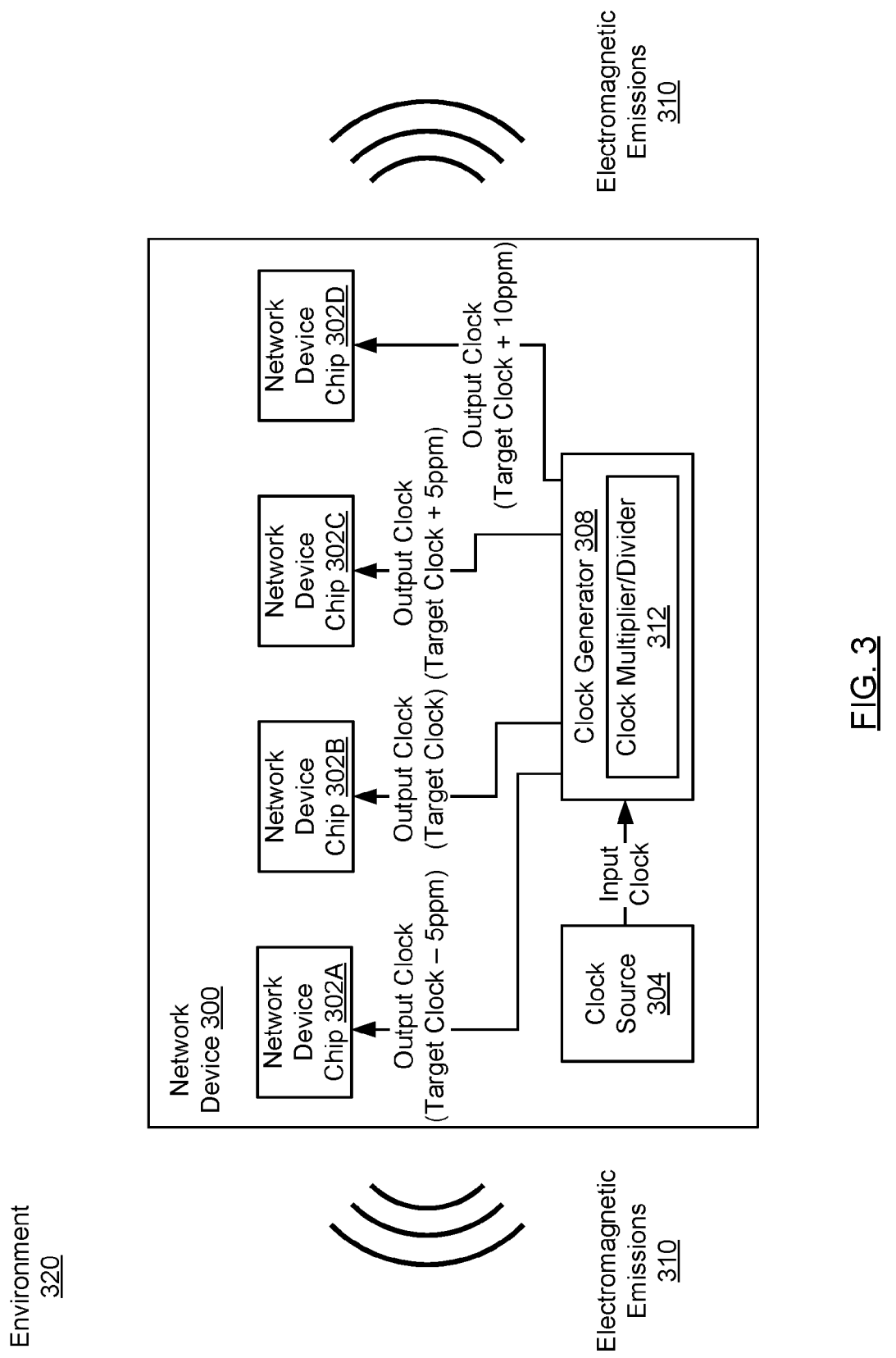
FIG. 3 shows a network device in accordance with one or more embodiments of the invention.

FIG. 3 shows a network device (300) in accordance with another embodiment of the invention. The network device chips (302A-302D) may receive clock signals from a clock generator (308). In order to reduce the peak electromagnetic radiation emitted by the network chips (302A-302D) at discrete frequencies, the clock signals generated by the clock generator (308), i.e., the output clock signals of the clock generator (308) that are distributed to the network device chips (302A-302D), have slightly different clock frequencies, as previously described.

In one or more embodiments of the invention, clock generator (308) derives the output clock signals for the network device chips (302A-302D) from an input clock signal received from a clock source (304). The input clock signal may be generated by a crystal oscillator, and may be, for example, a 25 MHz clock signal. In one or more embodiments of the invention, the clock generator (408) may derive output clock signals with deviating frequencies from the input clock signal. In one embodiment of the invention, the clock frequencies of the output clock signal may deviate from a target clock frequency within a predetermined range. For example, an output clock signal with a target clock frequency of 312.25 MHz may be derived from the input clock signal and additional clock signals, also derived from the input clock signal, may be evenly distributed in a predetermined range above and/or below the target clock frequency (e.g., at target frequency+/−5 ppm, target frequency+/−10 ppm, etc.), or they may be non-evenly distributed in a predetermined range above and/or below the target clock frequency (e.g., at target frequency+5 ppm, target frequency+10 ppm, and target frequency−5 ppm). Accordingly, an output clock signal may have a unique frequency above, at, or below the target clock frequency. The frequency spacing of the derived clock signals in accordance with one or more embodiments of the invention may be 5 ppm or any other frequency spacing, for example, 10 ppm, 15 ppm, or 25 ppm. While FIG. 3 shows a clock source (304) separate from the clock generator (308), the clock source may be incorporated in the clock generator.

In one or more embodiments of the invention, the clock generator may include, for each derived clock signal that has a frequency different from the frequency of the reference clock signal, one or more clock multipliers and/or dividers (312), e.g., in the form of one or multiple cascaded fractional output divider(s). The fractional output divider (or set of cascaded fractional output dividers), used to derive a clock signal with a particular frequency from the reference clock signal, is (are) parameterized to implement the multiplier or divisor necessary to increase or reduce the frequency of the reference clock signal by the amount necessary to generate the particular frequency.

As previously described, the distribution and use of each of these clock signals by circuit components therefore may result in the emission of electromagnetic energy at discrete frequencies. However, because the frequencies of the clocks all differ, the emission peaks are located at different frequencies. The emissions of electromagnetic energy from the multiple clock signals with different frequencies therefore do not add up to high-amplitude electromagnetic emission peaks but rather form a series of smaller-amplitude peaks in frequency windows, i.e. the emitted electromagnetic energy may be distributed over a small frequency window, rather than being concentrated at a discrete frequency. Correspondingly, and in accordance with one or more embodiments of the invention, the electromagnetic emissions at harmonic frequencies are also distributed over small frequency windows rather than being concentrated at discrete frequencies. As previously described, the electromagnetic emissions (310) radiated into the environment (320) by a network device (300), in accordance with one or more embodiments of the invention, therefore include relatively low amplitude bands rather than isolated high amplitude peaks of electromagnetic emissions, as illustrated by the qualitative example shown in FIG. 4.

The method and system for reducing peak electromagnetic interference in a network device may reduce the energy of electromagnetic emissions affiliated with clock signals of a network device by distributing the electromagnetic emissions over a range of frequencies. Accordingly, the method and the system may allow reduction of emissions of electromagnetic radiation at particular frequencies without necessarily requiring potentially costly additional shielding and grounding measures. The method and system for reducing peak electromagnetic interference may therefore facilitate the compliance with regulatory requirements, and may reduce the electromagnetic interference a network device in accordance with one or more embodiments of the invention may cause in a cost effective manner.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A network device comprising:
   a plurality of clock sources; and
   a plurality of clocked components,
   wherein a first clocked component of the plurality of clocked components receives a first clock signal with a first actual clock frequency from a first clock source of the plurality of clock sources,
   wherein a second clocked component of the plurality of clocked components receives a second clock signal with a second actual clock frequency from a second clock source of the plurality of clock sources, and
   wherein to reduce peak electromagnetic interference (EMI) within the network device:
      the first actual clock frequency is selected to deviate from a nominal frequency by a first specified amount, within a predetermined range, and the second actual clock frequency is selected to deviate from the nominal frequency by a second specified amount, within the predetermined range.

2. The network device according to claim 1, wherein the predetermined range is within the nominal clock frequency +/−100 ppm.

3. The network device according to claim 1, wherein the first clock source of the plurality of clock sources is a first crystal oscillator and the second clock source of the plurality of clock sources is a second crystal oscillator.

4. The network device according to claim 1, wherein at least one of the plurality of clocked components is one selected from a group consisting of a switch chip, a fabric chip, and a PHY chip in the network device.

5. The network device of claim 1, wherein the network device is at least one selected from a group consisting of a switch, a router and a multilayer switch.

6. The network device of claim 1, wherein at least one of the clocked components is located on a printed circuit board (PCB) in the network device.

7. A network device comprising:
a plurality of clock sources; and
a component comprising a plurality of clocked subcomponents,
wherein a first clocked subcomponent of the plurality of clocked subcomponents receives a first clock signal with a first actual clock frequency from a first clock source of the plurality of clock sources,
wherein a second clocked subcomponent of the plurality of clocked subcomponents receives a second clock signal with a second actual clock frequency from a second clock source of the plurality of clock sources, and
wherein to reduce peak electromagnetic interference (EMI) within the network device:
the first actual clock frequency is selected to deviate from a nominal frequency by a first specified amount, within a predetermined range, and
the second actual clock frequency is selected to deviate from the nominal frequency by a second specified amount, within the predetermined range.

8. The network device according to claim 7, wherein the predetermined range is within the nominal clock frequency +/−100 ppm.

9. The network device according to claim 7, wherein the first clock source of the plurality of clock sources is a first crystal oscillator and the second clock source of the plurality of clock sources is a second crystal oscillator.

10. The network device according to claim 7, wherein the component is one selected from a group consisting of a switch chip, a fabric chip, and a PHY chip in the network device.

11. The network device of claim 7, wherein the network device is at least one selected from a group consisting of a switch, a router and a multilayer switch.

12. The network device of claim 7, wherein the component is located on a printed circuit board (PCB) in the network device.

13. A network device, comprising:
a clock generator that generates a plurality of output clock signals,
wherein each output clock signal of the plurality of output clock signals has a unique clock frequency,
wherein, to reduce peak electromagnetic interference (EMI) within the network device, the clock frequencies of the plurality of output clock signals are distributed within a pre-determined frequency range; and
a plurality of clocked components, wherein each clocked component of the plurality of clocked components receives one of the output clock signals.

14. The network device of claim 13, wherein one of the output clock signals is a clock signal with a target clock frequency.

15. The network device of claim 13, wherein the clock frequencies of the plurality of output clock signals are distributed above and below the target clock frequency.

16. The network device of claim 13, wherein the clock generator comprises at least one clock multiplier and wherein at least one of the plurality of output clock signals is generated using the at least one clock multiplier.

17. The network device of claim 13, wherein the clock generator comprises at least one clock divider and wherein at least one of the plurality of output clock signals is generated using the at least one clock divider.

18. The network device according to claim 13, wherein at least one of the clocked components is one selected from a group consisting of a switch chip, a fabric chip, and a PHY chip in the network device.

19. The network device of claim 13, wherein the clock frequencies of the plurality of output clock signals are evenly distributed within the pre-determined frequency range.

20. The network device of claim 13, wherein the clock frequencies of the plurality of output clock signals are non-evenly distributed within the pre-determined frequency range.

21. The network device of claim 13, wherein the pre-determined frequency range spans 25 ppm.

22. A network device, comprising:
a clock source that generates a reference clock signal with a reference clock frequency;
a clock generator that generates a plurality of derived clock signals from the reference clock signal,
wherein each derived clock signal of the plurality of derived clock signals has a unique clock frequency,
wherein, to reduce peak electromagnetic interference (EMI) within the network device, the clock frequencies of the plurality of derived clock signals are distributed within a pre-determined frequency range; and
a clocked component comprising a plurality of clocked subcomponents, wherein each clocked subcomponent of the plurality of clocked subcomponents receives one of the derived clock signals.

\* \* \* \* \*